Figure 3:
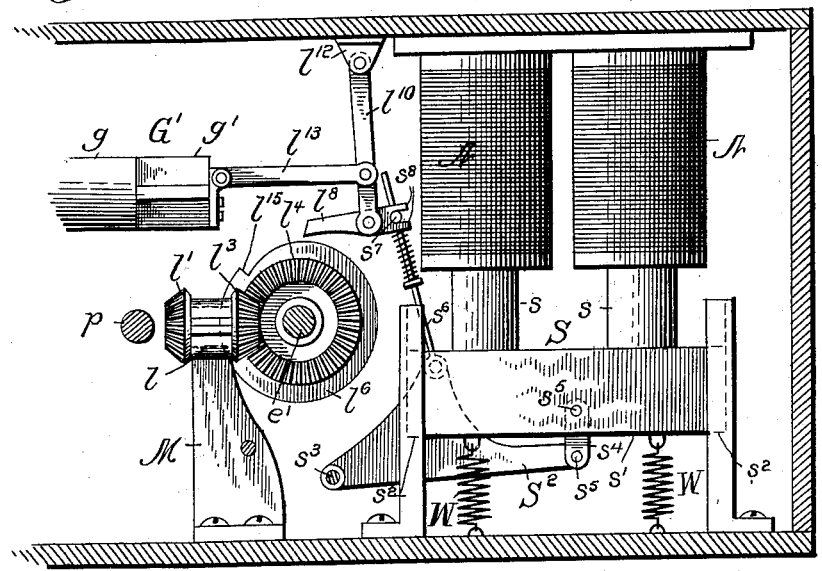

No. 626,020. Patented May 30, 1899.
F. H. FOSTER.
MECHANISM FOR STARTING, STOPPING, AND REVERSING DIRECTION OF MOTION OF ELECTRIC MOTORS, AND FOR CONTROLLING SPEED OF SAME.
(Application filed July 8, 1898.)
(No Model.) 4 Sheets—Sheet 1.
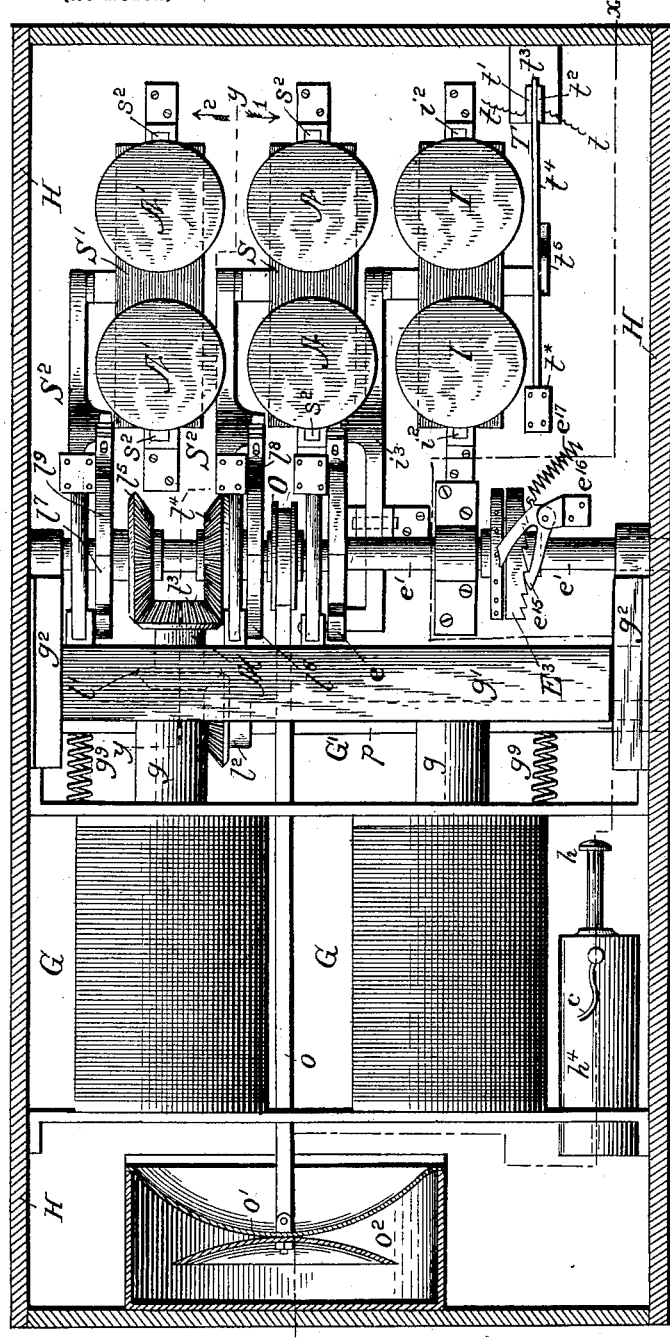
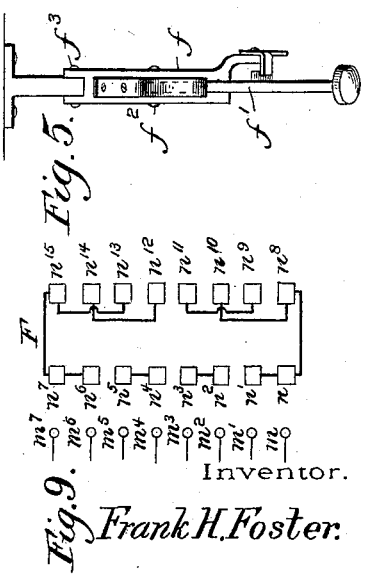
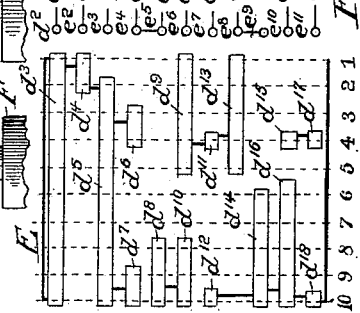
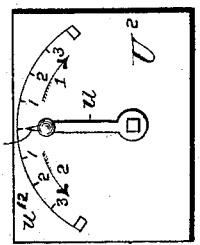
Witnesses.
Inventor.
Frank H. Foster.
By Attorney.

No. 626,020. Patented May 30, 1899.
F. H. FOSTER.
MECHANISM FOR STARTING, STOPPING, AND REVERSING DIRECTION OF MOTION OF ELECTRIC MOTORS, AND FOR CONTROLLING SPEED OF SAME.
(Application filed July 8, 1898.)
(No Model.) 4 Sheets—Sheet 2.
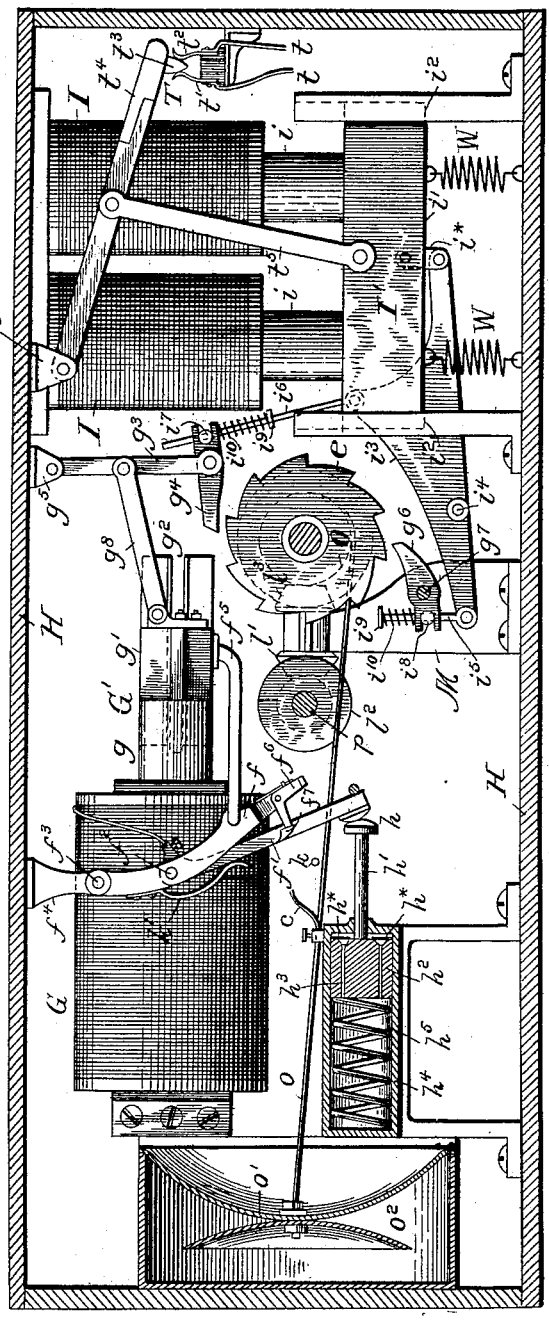
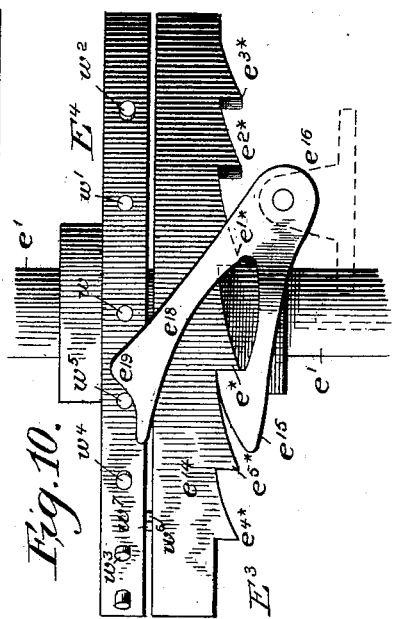
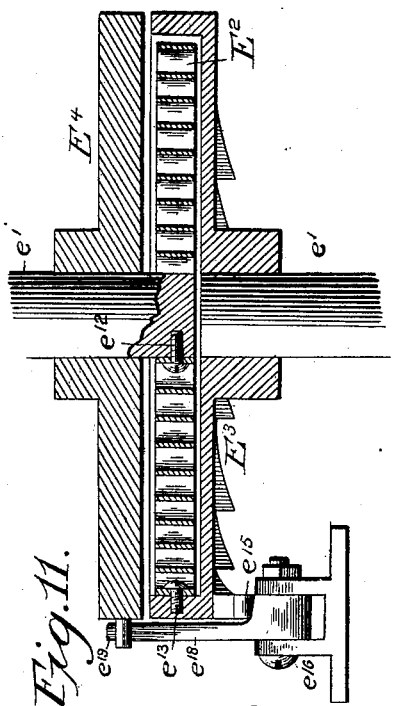
Witnesses.
Inventor.
Frank H. Foster.
By
Attorney.

No. 626,020. Patented May 30, 1899.
F. H. FOSTER.
MECHANISM FOR STARTING, STOPPING, AND REVERSING DIRECTION OF MOTION OF ELECTRIC MOTORS, AND FOR CONTROLLING SPEED OF SAME.
(Application filed July 8, 1898.)
(No Model.) 4 Sheets—Sheet 3.

Witnesses.

Inventor.
Frank H. Foster.
By
Attorney.

No. 626,020. Patented May 30, 1899.
F. H. FOSTER.
MECHANISM FOR STARTING, STOPPING, AND REVERSING DIRECTION OF MOTION OF ELECTRIC MOTORS, AND FOR CONTROLLING SPEED OF SAME.
(Application filed July 8, 1898.)
(No Model.) 4 Sheets—Sheet 4.
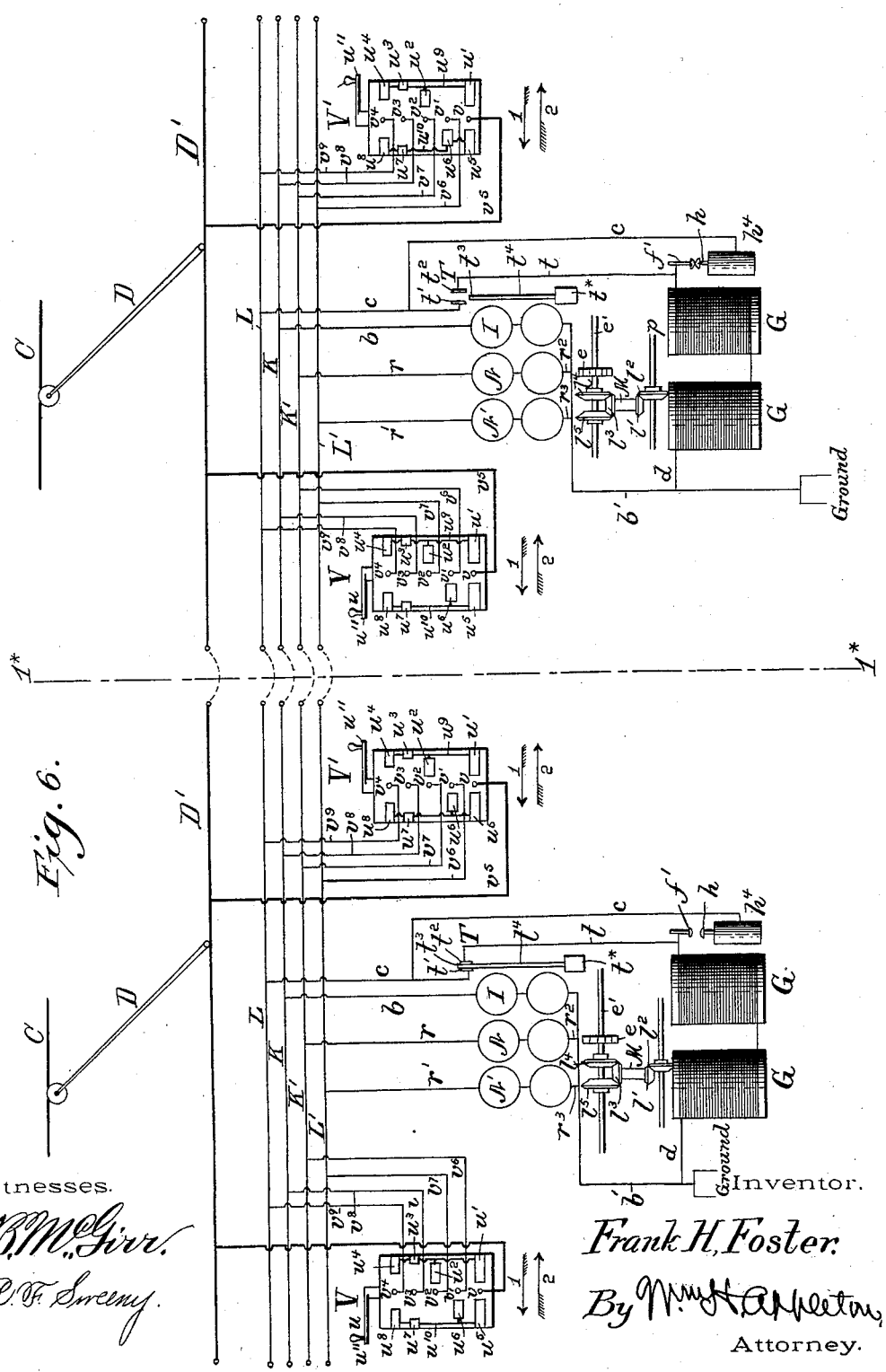
Witnesses.
J. B. McGirr.
R. F. Sweeny.
Inventor.
Frank H. Foster.
By Wm H Appleton,
Attorney.
THE NORRIS PETERS CO., PHOTO-LITHO., WASHINGTON, D. C.

United States Patent Office.

FRANK H. FOSTER, OF NEW YORK, N. Y.

MECHANISM FOR STARTING, STOPPING, AND REVERSING DIRECTION OF MOTION OF ELECTRIC MOTORS AND FOR CONTROLLING SPEED OF SAME.

SPECIFICATION forming part of Letters Patent No. 626,020, dated May 30, 1899.

Application filed July 8, 1898. Serial No. 685,383. (No model.)

*To all whom it may concern:*

Be it known that I, FRANK H. FOSTER, a citizen of the United States, and a resident of New York, in the county of New York and State of New York, have invented certain new and useful Improvements in Mechanisms for Starting, Stopping, and Reversing the Direction of Motion of Electric Motors and for Controlling the Speed of the Same, of which the following is a specification.

My invention, while relating generally to mechanisms that are made use of for starting, stopping, and reversing the direction of motion and controlling the speed of electric motors, has reference more particularly to that form of mechanism illustrated in United States Letters Patent No. 598,199, which were granted to me February 1, 1898, upon which it is an improvement.

In the mechanism described in the Letters Patent aforesaid I have shown and described means through which a plurality of electric controllers may be progressively rotated in unison when it is desired to start and regulate the speed of a number of electric motors and then returned to their initial positions in unison when it is desired to arrest the motion of the latter, with devices through which a reversing-switch for the motors of each car may be properly operated to reverse the current passing thereto. The mechanism and device thus described, while efficient in moving the current-controllers and the reverse-switches to effect the proper movements of their respective motors, have been found defective in practice, principally because of the fact that as the starting and stopping of the motors and the movements of the reversing-switches are effected by the operation of switches which always make and break the circuits in precisely the same way with no means afforded for indicating the positions of the various reversing-switches it frequently happens that when a number of motors with their accompanying current-controllers and reversing-switches are brought together for use in synchronism—as, for instance, when a train of electrically-propelled cars is made up for movement along the track—the reversing-switches of some of the motors or cars will be so adjusted as to cause the current to pass through their respective motors in one direction, while the reversing-switches of the others will be so adjusted as to cause the currents to pass through their motors in an opposite direction. As a result of this, when the current is supplied to the various motors or cars from a single point upon the train the motors of some of the cars will rotate in one direction and the motors of the other cars will rotate in the other, with the consequent effect of making some of the cars tend to move in one direction and some in the other, and this inharmonious action can only be obviated by so actuating each of the reversing-switches that are conducting their currents to their respective motors in the wrong direction as to cause it to conduct its current thereto in the right direction independently of the others. Furthermore, with the construction shown and described in the Letters Patent aforesaid the current-controllers, being fixedly secured with relation to their respective actuating-ratchets, are not capable of variable movement with relation thereto, as is necessary where in some portions of their rotation the current-controllers are arrested in their movements and then moved quickly forward over a certain portion of the same.

The objects of my present invention are therefore to obviate these objections and to provide means whereby not only the movement of all the cars or other parts operated in the same direction may be insured and the manner in which the currents are to be supplied to the motors to effect those movements in the required direction indicated to the motorman or other operator, but a variable and intermittent movement imparted to the current-controllers as well.

To these ends the invention consists, first, in the means whereby the several reversing-switches are all operated in unison to cause the delivery of the current to their respective motors in the proper direction to insure of all of the latter communicating their movements to the parts to be operated in the same direction; second, in the means whereby the reversing-switches are operated to reverse the directions of the currents that may be passed to their respective motors and the direction in which such switches are moved indicated to the motorman or other operator; third, in the means whereby the movements of the current-controllers are arrested at one point in their rotation and then moved rapidly forward over another portion thereof, and, fourth, in various other constructions and combinations of parts, all as will hereinafter more fully appear.

Figure 4:
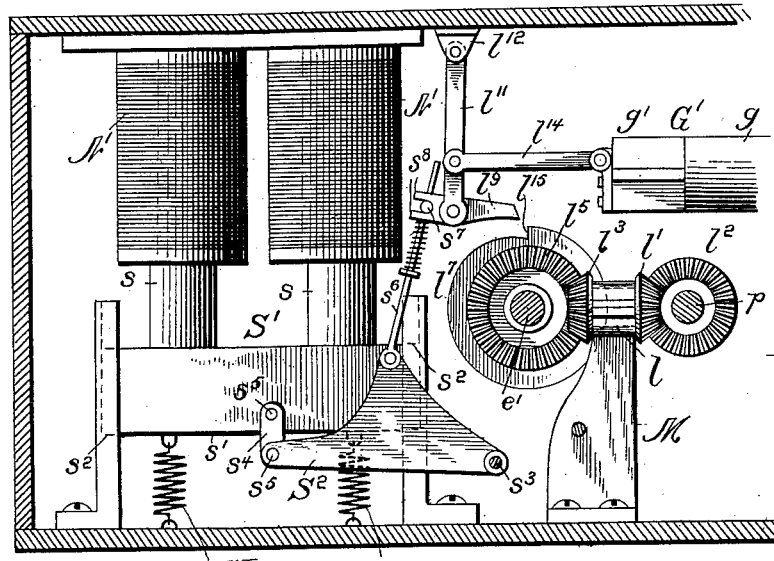

Referring to the accompanying drawings, which form a part of this specification, Figure 1 is a plan view of a mechanism for operating a current-controller and reversing-switch constructed in accordance with my invention, the containing-case and vacuum-chamber being shown in longitudinal section and a portion of the circuit-breaker, which coöperates with the main operating-magnet, omitted; Fig. 2, a longitudinal sectional elevation of the same, taken on the line $xx$ of Fig. 1; Fig. 3, a longitudinal sectional elevation of the mechanism made use of for operating the reversing-switch, taken on the line $yy$ of Fig. 1 and looking in the direction of the arrow 1 in that figure; Fig. 4, a similar longitudinal sectional elevation of the same mechanism, taken on the line $yy$ of Fig. 1, but looking in the direction of the arrow 2 in that figure; Fig. 5, a front elevation of the levers which form a part of the circuit-breaker of the main actuating-magnets with their supporting bracket or hanger detached; Fig. 6, a diagrammatic view showing the magnets for each of the cars and the electric circuits in which they are respectively located with the switches through which the several circuits may be opened and closed in the required order to start, stop, and reverse the direction of rotation of the motor; Fig. 7, a plan view of one of the switch-levers and the case in which one of the starting, stopping, and reversing switches is located; Fig. 8, a diagrammatic view of one form of current-controller and coöperating contacts with the former developed on a plane; Fig. 9, a similar diagrammatic view of one form of reversing-switch and its coöperating contacts with the former likewise developed as upon a plane; Fig. 10, a plan view of the devices through which the current-controller is operated from its actuating-ratchet and the movements of the former arrested during a portion of the rotation of the latter and then moved rapidly forward over a portion of its rotary movement; and Fig. 11, a longitudinal sectional elevation thereof, taken vertically of Fig. 10 and showing the pawl and the shafts in elevation with a portion of the shaft that supports the operating-ratchet broken away.

In all the figures like letters of reference are employed to designate corresponding parts.

C indicates the overhead or other main conductor through which the electric current is supplied from the power-house or other source of electric supply; D, the trolley arms or poles by means of which the current is transmitted from the conductor C to the motors and other points required; E, the current-controller, and F the reversing-switch, through the intervention of which the reversal of the direction of motion of the motors may be effected.

When applied to electrically-propelled cars, I prefer to employ a separate trolley-arm D for each of the cars, and to permit of the current taken from the conductor C by any one of a series of trolley-arms reaching the motors of all the cars in the train I provide each of the cars with a conductor D′, which is provided at each of its ends with a suitable coupling whereby the conductors of adjacent cars may be electrically connected and made continuous throughout the train, as shown, for instance, in Fig. 6, wherein I have illustrated in diagrammatic form my invention as applied to two different cars that are separated from each other by the broken line $1^\times$.

Located upon each of the cars is an electromagnet G, by means of which and its coöperating armature G′ the current-controller and reversing-switch of such car may be operated. This electromagnet, with its armature, may be constructed in various forms. I prefer, however, to construct the magnet in the form of a double solenoid and to construct the armature in the form of two cores $g$, which enter their respective solenoid-coils and are secured at their outer ends to a bar $g'$, that is fitted to slide in suitable guideways $g^2$, supported from any convenient part of the housings—as, for instance, the interior of the casing H, as shown.

With the parts constructed and arranged as above explained the rotation of the current-controller therefrom may be effected in various ways. In my preferred form of construction, however, I accomplish this result through the intermediaries of a pawl $g^4$ and a ratchet $e$, the former of which is pivoted to the lower end of a lever $g^3$, that, pivoted at its upper end in a stand or hanger $g^5$, secured to the casing H, is connected near its lower end with the bar $g'$ through the intervention of a connecting-rod $g^8$, while the latter of which is fixedly secured to the shaft $e'$ of the current-controller E, which in the embodiment of my invention shown in the drawings is, with the reversing-switch F, arranged in a horizontal or recumbent position. The several parts being thus disposed, when the pawl $g^4$ is brought into engagement with the ratchet $e$ the rotation of the current-controller E by an intermittent progressive movement will be effected by simply moving the armature G′ back and forth toward and away from the magnets G, and its rotation in the opposite direction will be prevented by a detent $g^6$, which, pivoted within the casing H or other convenient part of the housings upon a pivot $g^7$, engages with the teeth of the ratchet $e$, as is common to such devices.

To provide for bringing the pawls $g^4$ and $g^6$ into engagement with the ratchet $e$ when the intermittent rotation of the current-controller in one direction is required and for carrying them out of engagement therewith when the rotation in the opposite direction is desired, I make use of an electromagnet I and a coöperating armature I', which, as with the electromagnet G and armature G', may be constructed in various forms. As here shown, however, the electromagnet I is, like the magnet G, constructed in the form of a double solenoid, while the armature I' is, like the armature G', composed of two cores $i$, which enter their respective solenoid-coils and are connected at their outer ends with a bar $i'$, that is fitted to slide in suitable guideways $i^2$, supported from the casing H or other convenient part. From the armature I' the appropriate movements may be communicated to the pawl $g^4$ and detent $g^6$ through various means. I prefer, however, to employ for this purpose a lever $i^3$, which, journaled upon a rod $i^4$ and jointed at one of its ends to the bar $i'$ by a connecting-rod $i^\times$, is connected on one side of its fulcrum with the pawl $g^4$ through a connecting-rod $i^6$ and on the opposite side of such fulcrum is connected with the detent $q^6$ through a connecting-rod $i^5$. As thus arranged, the engagement of the pawl and detent thus mentioned with the ratchet $e$ and their disengagement therefrom are effected by simply moving the armature I' back and forth toward and away from the magnet I, and in order to permit of the pawl and detent moving back over the teeth of the ratchet when in engagement therewith the connecting-rods $i^5$ and $i^6$ instead of being positively jointed to their respective detent and pawl are arranged in orifices formed in studs $i^7$ and $i^8$, that are respectively journaled therein, with each of the rods provided with a collar $i^9$, between which and its respective detent or pawl is arranged a coil-spring $i^{10}$.

The means through which the current is supplied to the magnets I and G when their energization is required to effect the engagement of the pawl $g^4$ and detent $g^6$ with the ratchet $e$ and to impart the appropriate movements to the current-controller E and reversing-switch F consists of the conductors K and L. These conductors extend throughout the length of the cars and are provided at their ends with suitable coupling devices whereby the corresponding conductors of the several cars may be united and the electromagnets of the several cars thereby rendered active in unison.

The conductor K of each car is connected with the electromagnet I of the latter by a conductor $b$, and the circuit in which these several elements are combined is rendered complete by a conductor $b'$, leading from the magnet to the ground either directly or through one of the car-wheels, as preferred, while the conductor L of each car is in like manner connected with the electromagnet G of its particular car by a conductor $c$, and the circuit in which these several parts are embraced is similarly rendered complete by a conductor $d$, that extends from the magnet to the conductor $b'$, which, as before remarked, extends to the ground. Each of the cars being thus provided with conductors K and L, as well as with electromagnets I and G and the coöperating devices and electric connections above explained, it follows that when a number of cars thus similarly equipped are brought together into a train and the conductors K and L of the adjacent cars properly connected the electromagnets I and G of all the cars in the series will be rendered active or inactive in unison and all the pawls $g^4$ and detents $g^6$ in like manner thereby carried into or out of engagement with the teeth of their respective ratchets $e$ with the consequent effect of either rotating the current-controllers of all the cars in synchronism or of arresting their rotation in the same manner by simply connecting the conductors K and L in the required order with the trolley D or disconnecting them therefrom on any one of the platforms of the train, as the action or non-action of these magnets may require. The operation of the current-controller of each car when brought into action being thus effected from an electromagnet G through the armature G' and the necessities of its operation requiring that its forward rotation be accomplished by an intermittent step-by-step movement, it is necessary to the imparting of this movement thereto that a back-and-forth movement be communicated to the armature G'. In order to accomplish this, it is essential that the circuit in which the operating-electromagnet of this armature is brought by electrically connecting the conductor L with the trolley D be broken and made a number of times in succession, whereby to render the said magnet in like succession inactive and active.

For breaking and making the circuit in which each of the electromagnets is arranged I make use of a circuit-breaker. This circuit-breaker may be constructed in various forms. I prefer, however, to construct it in the form of two levers $f$ and $f'$, which are pivoted together by a pivot $f^2$, and the former, which is slotted to receive the latter between its depending legs, is fulcrumed upon a pivot $f^3$ in a stand $f^4$, that is secured to the support of the electromagnet G or other convenient part of the housings, as desired. The lever $f$ is connected with the bar $g'$ of the armature G' by a suitable connecting-rod $f^5$, whereby to be moved back and forth therewith, and is provided at its free end with the spring-actuated bell-crank-shaped trigger $f^6$, which normally engages with a lug $f^7$, secured to the side of the lever $f'$, that constitutes one terminal of the conductor $c$ in circuit with the electromagnet G. At all points the lever $f'$ is insulated from the lever $f$, and in its movements it coöperates with the other terminal $h$ of the conductor $c$, which is preferably carried upon the free end of a rod $h'$ of a piston $h^2$, that is provided with suitable air-passages $h^3$, formed therethrough, and is fitted to slide back and forth in the cylinder or dash-pot $h^4$, which is secured to the casing H or other convenient stationary part of the car, suitable check-valves $h^×$ being employed in connection with the air-passages $h^3$ for retarding the outward travel of the piston $h^2$ in the cylinder $h^4$, while yet leaving it free to be moved in an opposite direction therein. As thus arranged, with the trigger $f^6$ engaged with the lug $f^7$, whenever the armature G' is moved toward the electromagnet G either through the attraction of the latter or otherwise the levers $f$ and $f'$, with the two terminals and the rod and piston of the dash-pot, will be moved in a similar direction therewith or in a direction toward the left in Figs. 1 and 2 of the drawings without any break between the two contacting terminals taking place. In order, therefore, to provide for breaking the circuit in which the electromagnet G is located when this movement of the parts is being effected, I provide a pin or an abutment $k$, which is arranged in the line of travel of the outer end of the trigger $f^6$, and employ in connection with the levers $f$ and $f'$ and with the piston $h^2$ of the dash-pot appropriately-formed springs $k'$ and $h^5$, respectively. By this arrangement whenever the conductor L is electrically connected with the trolley D and the circuit in which the electromagnet G is located is thereby closed this electromagnet will be immediately magnetized and its armature G' thereby attracted and caused to move toward it on the guideways $g^2$. As a result of this movement of the armature the pawl $g^4$, which is connected therewith through the intervention of the lever $g^3$ and connecting-rod $g^8$, will be caused to rotate the current-controller ratchet $e$ through the distance of one tooth, and the parts composing the circuit-breaker will be carried in the direction in which the armature was attracted. In moving with the armature the outer end of the trigger $f^6$ in passing the pin or abutment $k$ will engage therewith and be thereby disengaged from the lug $f^7$ on the lever $f'$, which will then be forced back away from the terminal $h$ of the conductor $d$ by the spring $k'$, and the circuit in which the magnet is located thereby broken. This breaking of the circuit will cause the immediate demagnetizing of the magnet G, when the armature G' will be forced back away from the same by suitable springs $g^9$, the pawl $g^4$ thereby forced back over the ratchet $e$ for engagement with another tooth thereof and the lever $f$ of the circuit-breaker carried back into position for engagement of its trigger with the lug on the lever $f'$. As these levers $f$ and $f'$ are thus carried forward in a direction away from the terminal $h$ this terminal will under the influence of the coiled spring $h^5$ follow thereafter; but in consequence of the resistance afforded to the outward movement of the piston $h^2$ by the air in front of it in the cylinder or dash-pot $h^4$ the movement of the terminal $h$ therewith will be retarded. It will, however, be forced back slowly into contact with the lever $f'$, when the circuit will be again restored, the magnet G a second time attracted, the ratchet $e$ operating the current-controller rotated through the space of another tooth, and the levers $f$ and $f'$ moved for a second break of the circuit, and so on, the breaking and making of the circuit and the operation of the various parts being thus continued until the electrical connection between the conductor L and the trolley D is broken or the rotation of the current-controller E is restrained by a suitable stop, with which it may in practice be provided. While thus the breaking and making of the circuit in which the magnet G is included on each of the cars is automatically effected when the operation of the current-controller is required the breaking and making of the corresponding circuits on all the cars of the train when the several controllers are to be operated is similarly accomplished automatically in unison in consequence of all of such circuits, including as one of their elements the common conductor L, which when its parts are united extends throughout the entire series of cars composing the train.

With the parts above described for carrying the pawl $g^4$ and detent $g^6$ into and out of engagement with their respective ratchets $e$ and operating the several current-controllers E of the train in unison from any one of the platforms of the cars of the train I make use of devices whereby after the several controllers have been rotated to start and control the speed of their respective cars these several controllers are all returned to their initial positions, when their respective pawls $g^4$ and detents $g^6$ are removed from their actuating-ratchets ready for the next forward movement. The mechanism through which this return of each of the current-controllers to its initial position is effected may be modified in various ways. In the form selected by me for the illustration of my invention, however, it consists of a drum O, which is fixedly secured to the shaft $e'$ of the current-controller of each of the cars and has connected with its periphery one end of a band $o$, the other end of which is connected with appropriate retracting means—as, for instance, a diaphragm $o'$ of a vacuum-chamber $o^2$, that is or may be secured to the casing H or other convenient part of the car. By these means when the current-controllers of the several cars are rotated forward under the action of their respective pawls $g^4$ and ratchets $e$ the several bands coöperating with them will all be wound upon their respective drums O and the diaphragms $o'$, to which they are respectively secured, thereby distorted. The several diaphragms having been thus brought into action will when the pawls $g^4$ and detents $g^6$ are removed from engagement with the teeth of their respective ratchets, as when the circuits in which the electromagnets I are respectively located are broken by interrupting the electrical connection between the conductor K and the trolley D to stop the train, resume their normal forms, and thereby, through the bands o and drums O, automatically return their respective current-controllers E to their original positions ready for further forward rotation when the respective circuits in which the electromagnets G and I are again restored, as is the case when the train is to be again started.

The parts as thus far described, with the exception of the forms of the electromagnets G and $i$ and other immaterial variations, are or may be substantially the same as the corresponding parts shown and described in my before-mentioned patent, wherein in the main they are severally indicated by the same letters of reference.

The parts to which my present invention more particularly relate will now be described.

Rotatively mounted in a stand M, that is supported from the casing H or other convenient part, is a shaft $l$, which, provided at one of its ends with a bevel-gear $l'$, that meshes with a corresponding bevel-gear $l^2$, fixedly secured to the shaft $p$ of the reversing-switch F, is equipped at its other or opposite end with a second bevel-gear $l^3$, that is arranged between and meshes with the two bevel-gears $l^4$ and $l^5$, that are disposed opposite each other and each provided on its hub with a ratchet $l^6$ or $l^7$, through which and through the shaft and gears above explained the oscillation of the reversing-switch F is accomplished when required to effect the reversal of the current passing to the motor. These bevel-gears $l^4$ and $l^5$, with their connected ratchets, are or may be rotatively or otherwise mounted upon any convenient shaft or upon one especially provided therefor. I prefer, however, to rotatively mount them upon the shaft $e'$ of the current-controller E and to effect their oscillation back and forth thereon from the armature G' through the intervention of the pawls $l^8$ and $l^9$, which respectively engage with the ratchets $l^6$ and $l^7$. These pawls may be mounted in various ways. In the form of the invention selected by me for illustration, however, they are respectively pivoted to the lower ends of levers $l^{10}$ and $l^{11}$, which, fulcrumed at their upper ends in stands $l^{12}$, secured to the casing H, are respectively connected with the bar $g'$ of the armature G' by connecting-rods $l^{13}$ and $l^{14}$, whereby to be caused to move back and forth therewith as the passage of the current through the coils of the electromagnet G is permitted and interrupted. As thus arranged the oscillation of the reversing-switch F in one or the other direction is effected when the electromagnet G is energized by simply bringing one or the other of the pawls $l^8$ and $l^9$ into engagement with its respective ratchet $l^6$ or $l^7$, when such ratchet will be carried around by the pawl as the armature G' is attracted and the appropriate movement thereby communicated to the reversing-switch through the several bevel-gears and shafts $l$ and $e'$ above noted. The means through which the pawls may be brought into and carried out of engagement with their respective ratchets as the movement of the reversing-switch in one or the other direction may require may be of various forms. In the preferred embodiment of my invention, however, it consists of two electromagnets N and N' with their respective cooperating armatures S and S', one of which electromagnets, with its cooperating armature, being employed in connection with one of the pawls and the other of such electromagnets, with its armature, being employed in connection with the other. These electromagnets and armatures may be of any of the ordinary and well-known forms. In the drawings, however, I have shown each of the former as constructed in the form of a double solenoid and each of the latter as composed of two cores $s\ s$, which are adapted to enter the coils of its respective magnet, and are secured at their outer ends to a bar $s'$, that is fitted to slide at its ends in guideways $s^2\ s^2$, which are supported from the casing H or other convenient part. As thus constructed and arranged the armature of each of the electromagnets is connected with its respective pawl $l^8$ or $l^9$ through the intervention of a lever $s^2$, which, fulcrumed at one of its ends upon the rod $s^3$ and jointed at its other to its appropriate armature by a link $s^4$ and pivots $s^5$, is coupled with its respective pawl by a connecting-rod $s^6$, which is jointed at one of its ends to the lever at a point intermediate its ends and has its other end hinged to the pawl through the intermediary of a block $s^7$, that is journaled in an arm $s^8$, extending rearwardly therefrom.

With the pawls $l^8$ and $l^9$ connected with the armatures of their respective electromagnets N and N', as above explained, and the bevel-gears $l^4\ l^5$, upon which the ratchets $l^6$ and $l^7$ are respectively secured, arranged to mesh with the bevel-gear $l^3$ on opposite sides of its axis, it results that when one or the other of these electromagnets is energized by passing an electric current through the coils thereof the particular pawl $l^8$ or $l^9$ operated therefrom will be carried into engagement with its respective ratchet $l^6$ or $l^7$, and when moved forward by the armature G' of the electromagnet G, as that electromagnet is similarly energized, it will cause that ratchet to rotate forward with it and through the intermediate bevel-gears and shafts effect the oscillation of the reversing-switch F in one direction. On the other hand, when the other of these electromagnets N and N' is energized by the passing of an electric current through its coils the pawl $l^8$ or $l^9$ operated therefrom will in like manner be carried into engagement with its appropriate ratchet $l^6$ or $l^7$, and when moved forward by the armature G', as the latter is attracted by its cooperating electromagnet G, it will cause such ratchet to rotate forward with it and similarly through the intermediate bevel-gears and shafts, before noted, oscillate the reversing-switch F in an opposite direction, and thus as the one and then the other of the electromagnets N and N' is successively energized and rendered inactive and the armature G' moved alternately toward and away from its coöperating electromagnet G, as the latter is rendered active and inactive, first one and then the other of the pawls $l^8$ and $l^9$ will be brought into and carried out of engagement with its respective ratchet $l^6$ or $l^7$, as well as moved forward and backward, and the reversing-switch F correspondingly oscillated first in one direction and then in the other, as may be required. The oscillation of the reversing-switch F in one or the other direction being thus effected from the ratchets $l^6$ and $l^7$ and these ratchets being geared together through the bevel-gears $l^4$, $l^3$, and $l^5$, it follows that when one of these ratchets is rotated forward under the impulse of its operating-pawl $l^8$ or $l^9$ the other ratchet will be rotated backward in an opposite direction through the gearing specified. As thus operated the distance through which each of the ratchets is rotated to effect the oscillation of the reversing-switch from one of its limits of movement to the other extends from the extreme backward to the extreme forward position of the ratchet, and this rotation is imparted by a single forward impulse of its actuating-pawl. In order, therefore, to prevent a further forward rotation of the ratchet after the reversing-switch has been oscillated in the proper direction thereby as well as to insure of all the reversing-switches F employed together being brought into position to cause the parts operated from the several motors to all move in the same direction, no matter in what position those switches may have been previously arranged, and thereafter maintained a synchronous operation of the said parts, I construct each of the ratchets $l^6$ and $l^7$ with but a single pawl-engaging tooth $l^{15}$, which is so related to the pawl-engaging tooth of the other that when one of the ratchets has been rotated forward to the limit of its movement by its operating-pawl, as shown in Fig. 3, the other has been rotated backward therefrom through the bevel-gears $l^4$, $l^3$, and $l^5$ until its pawl-engaging tooth has been brought beneath and slightly in advance of the free end of its coöperating pawl, as shown in Fig. 4, ready for the engagement of the latter therewith as such pawl is brought into operation by its respective electromagnet N or N' and carried forward by the armature G'. By this arrangement, as will be seen, when the reversing-switch F has been oscillated to one of its limits of movement the ratchet through which its oscillation was effected will have been rotated forward until its pawl-engaging tooth $l^{15}$ is in its most advanced position, as shown in Fig. 3. If, therefore, while in this position its actuating-pawl should be again rendered operative to rotate it forward, it is obvious that such pawl would slide forward over the smooth peripheral surface of the ratchet without in any way accomplishing its rotation. If, on the other hand, the reversing-switch had not been oscillated into this position, but was at the other limit of its movement, with the pawl-engaging tooth $l^{15}$ of the ratchet in its extreme backward position, as shown in Fig. 4, and this pawl was rendered operative, then it is clear that such pawl would engage with the engaging tooth $l^{15}$ and as it was carried forward would rotate its ratchet, and through it effect the oscillation of the reversing-switch to its other limit of motion. The further forward rotation of either of the ratchets $l^6$ and $l^7$ after having been operated to effect the oscillation of the reversing-switch F into the required position being thus prevented, it follows that when a number of reversing-switches are brought together—as, for instance, those upon the cars of a train—and it is desired to either bring them all into positions to insure of the parts operated from their respective motors all moving in same direction or subsequently oscillate them in unison to effect a reversal of the current passing to such motors, all that is necessary is to energize the appropriate electromagnets N or N' of all the reversing-switches, as well as the several electromagnets G, when all the reversing-switches will be brought into synchronism or subsequently oscillated in unison, as the case may be. The reversing-switches having been thus operated and the circuits in which the electromagnets are located having been broken, the armatures S and S' of the respective electromagnets N and N' will, with the pawls connected therewith, be returned to their original normal positions ready for a repetition of such movement by the coiled springs W, which, connected at one end with such armatures, are connected at the other with the casing H or otherwise, as shown.

The means through which the electric current is supplied to the electromagnets N and N' to effect their energization when their respective pawls $l^8$ and $l^9$ are to be brought into operation to oscillate the reversing-switch in one or the other direction, as the requirements of the motor may demand, consists of the conductors K' and L', respectively, which preferably extend throughout the length of the car and, like the conductors K and L, are each provided at its ends with suitable connections, whereby the corresponding conductors of adjacent cars may be connected, and thereby made continuous throughout the train. The conductor K' is preferably connected with the electromagnet N by a suitable branch conductor $r$, while the conductor L' is in like manner connected with the electromagnet N' by a similar branch conductor $r'$, and as thus connected and arranged the circuits in which the electromagnets are respectively located are rendered complete by additional short conductors $r^2$ and $r^3$, which extend from their respective electromagnets to the conductor $b'$, that leads to the ground, as before explained. The electromagnets N and N' being thus connected with their appropriate conductors K' and L', their energization is effected by bringing these conductors into electrical connection with the trolley D. The means through which this electrical connection is made may be of various forms. I prefer, however, to make use of an oscillatory switch U for the purpose and to also employ it for making electrical connection between the conductors K and L and the trolley when required. This switch may be located at any convenient point. When used in connection with a car, however, I find it desirable to locate one on the dash-board at each end thereof, and as thus disposed it preferably consists of a cylindrical body U', which is conveniently arranged within a suitable protecting-case $U^2$ and is provided at its upper end with a crank or handle $u$, through which it may be oscillated therein in one or the other direction, as may be required, a suitable pointer $u^{11}$, secured to the crank or handle $u$ and coöperating with an index $u^{12}$, attached to or formed upon the upper end of the casing $U^2$, serving to indicate to the motorman or other operative the direction and extent of motion of the switch that is necessary to cause the operation of parts and the movements of the motor in the direction required. With the crank or handle $u$ the body U' of the switch is also provided with two series of contacts, one of which, $u'$, $u^2$, $u^3$, and $u^4$, is located upon one side of an imaginary longitudinal median line and the other of which, $u^5$, $u^6$, $u^7$, and $u^8$, is located upon the other side thereof, with the members of the former series connected by a conductor $u^9$ and the members of the latter series in like manner connected by a conductor $u^{10}$. As thus arranged and connected these contacts are insulated from the body U', upon which they are carried, and coöperate with a third series of contacts $v$, $v'$, $v^2$, $v^3$, and $v^4$, which are immovably supported upon the interior of the supporting-case $U^2$ or otherwise in proper position with respect to the lines of travel of their respective contacts $u'$ $u^2$ $u^3$ $u^4$ and $u^5$ $u^6$ $u^7$ $u^8$ as the latter are carried beneath them by the oscillation of the body U' in one or the other direction by the motorman, and are respectively connected with the trolley D and the conductors L', K', K, and L by short conductors $v^5$, $v^6$, $v^7$, $v^8$, and $v^9$, as shown. In the form of switch selected by me for the illustration of my invention the connection of the trolley D with the proper conductors L', K', L, and K to effect the oscillation of the reversing-switch F and the operation of the motor in one or the other direction is accomplished by oscillating the body U' of the switch from its normal central position three steps in the required direction, whereby to first bring either the contacts $u'$ or $u^5$ against the contact $v$ and either the contact $u^2$ or $u^6$ against its respective contact $v^2$ or $v'$, next to bring either the contact $u^4$ or $u^8$ against the contact $v^4$, and, next and last, to bring either the contact $u^3$ or $u^7$ against the contact $v^3$ and at the same time carry the contact $u^2$ or $u^6$ out of engagement with its respective contact $v^2$ or $v'$, as the movement of such body is in one or in the other direction, respectively. In order to permit of the engagement of the contacts on the body U' of the switch with and their disengagement from those of the immovable series in the order mentioned as the oscillation of such body in the one or the other direction is effected, the inner ends of the contacts $u'$, $u^2$, $u^5$, and $u^6$ extend inward toward the immovable series to the greatest distance, the contacts $u^4$ and $u^8$ to a slightly less distance, and the contacts $u^3$ and $u^7$ to a still less distance, while the outer ends of the contacts $u^2$ and $u^6$ terminate in lines with the inner ends of the contacts $u^3$ and $u^7$, respectively. The connection of the several conductors K, L, K', and L' with and their disconnection from the trolley D being thus effected through the intervention of the switch described and the rotation of the current-controller E and the oscillation of the reversing-switch F being both accomplished from the electromagnet G and its coöperating armature G', I find it desirable to provide not only for the energization of that electromagnet a number of times in rapid succession, as when the current-controller is being rotated, by passing the electric current thereto through the terminals $f'$ and $h$ of the circuit-breaker, but also for its uninterrupted energization, as when the reversing-switch is being actuated, by passing such current thereto without the intervention of the terminals or the circuit-breaker. To this end I make use of the shunt-conductor $t$, which, connected at one of its ends with the conductor $c$ at a point intermediate the conductor L and the terminal $h$, is connected at its other therewith at a point intermediate the terminal $f'$ and the electromagnet G and is provided at an appropriate point along its length with a switch T, which is or may be opened and closed by the armature I'. In the construction of this switch various forms may be adopted. As here shown, however, it consists of the two contacts $t'$ and $t^2$, (see Fig. 2,) to each of which one end of its respective portion of the shunt-conductor is connected, and also of a blade $t^3$. This blade is preferably connected with the free end of a lever $t^4$, which, fulcrumed at its other end in a stand $t^\times$, that is secured to the casing H or other appropriate part, is connected with the armature I' by a connecting-rod $t^5$ in such a manner that when the magnet I is inactive and the armature I' is in its retracted position the blade $t^3$ will be carried between the contacts $t'$ and $t^2$ and the switch thereby closed, as shown in Fig. 2, and when, on the other hand, the magnet is rendered active and the armature attracted thereby it will be carried from between such contacts and the switch thereby opened. In Fig. 6 I have shown at the left this switch as closed, the free end of the lever $t^4$ being illustrated as made of a sufficient length to extend between the contacts $t'$ and $t^2$, while at the right in that figure it is shown as open, the lever $t^4$ in this case being conveniently illustrated as shortened and not reaching at its free end to said contacts.

With the parts arranged as above explained, when the switch T is closed the current admitted to the electromagnet G by connecting the conductor L with the trolley D will pass thereto through the conductor $t$, and thence to the ground along the conductor $b'$ without traversing the terminals $f'$ and $h$ of the circuit-breaker. As a consequence of this a circuit will be established through the electromagnet G, which will remain unbroken so long as the switch T continues closed and the electrical connection between the conductors L and the trolley D is maintained and only such movement will be imparted thereby to the reversing-switch F as is necessary to effect the required reversal of the direction of the current passing therethrough. On the other hand, when the switch T is opened by the energization of the electromagnet I, as when the pawl $g^4$ and the detent $g^6$ is to be brought into engagement with the ratchet $e$ or otherwise, the electric current supplied from the conductor L instead of passing along the shunt-conductor $t$ to the electromagnet G will travel along the conductor $c$ to and through the terminals $f'$ and $h$ of the circuit-breaker thereto, and thence to the ground along the conductor $b'$, with the consequent effect of having its flow alternately interrupted and established a number of times in succession and the electromagnet G thereby rendered inactive and active in harmony therewith. It will thus be seen that the passage of the current from the conductor L to the electromagnet G is controlled by the switch T, and that the operation of this electromagnet to accomplish the oscillation of the reversing-switch and the rotation of the current-controller is determined in the one case by closing said switch and in the other by opening it.

With the several conductors K, L, K', and L' connected with their respective electromagnets I, G, N, and N' and also with the immovable contacts $v^3$, $v^4$, $v^2$, and $v'$, as above explained, and with the contact $v$ connected with the trolley D the connection of these conductors with the trolley to cause the appropriate movements of the current-controller and reversing-switch is effected, as follows: Starting with the body U' of the switch in its normal central position, as shown in Figs. 6 and 7, and rotating it through its crank or handle $u$ the distance of one step in the direction of the arrow 1 in those figures, the contacts $u'$ and $u^2$ will be respectively brought beneath and against the immovable contacts $v$ and $v^2$ and the conductor K' thereby connected with the trolley D through the intervention of those contacts and the short conductors $u^9$, $v^7$, and $v^5$, the result of which will be to cause the energization of the electromagnet N therefrom through the medium of the short conductor $r$ and the bringing of the pawl $l^8$ into engagement with its coöperating ratchet $l^6$. The further rotation of the body U' to the distance of another step in the same direction through its crank or handle $u$ will bring the contact $u^4$ beneath and against the immovable contact $v^4$, while retaining the contacts $u'$ and $u^2$ beneath and against their respective contacts $v$ and $v^2$, when the conductor L will be similarly connected with the trolley D, through the short conductors $v^9$, $u^9$, and $v^5$ and the contacts $u^4$ and $v^4$, and the electromagnet thereby energized through the intermediary of the short conductors $c$ and $t$. The effect of this connection of the conductor L with the trolley D and of the energization of the electromagnet G will be to cause the forward movement of the pawl $l^8$ and through it the rotation of its coöperating ratchet $l^6$, with which it is held engaged by the electromagnet N, with the consequent oscillation of the reversing-switch F and reversal of the current passing to the motor thereby. The next and last forward rotation of the body U' the distance of another step in the same direction will bring the contact $u^3$ beneath and against the immovable contact $v^3$ and carry the contact $u^2$ inward away from its coöperating immovable contact $v^2$, when the conductor K will, through its coöperating contacts $u^3$ and $v^3$ and short conductors $v^8$, $u^9$, and $v^5$, be connected with the trolley D and the conductor K' disconnected therefrom. The conductor K being thus connected with the trolley D will cause the energization of the electromagnet I, with the consequent effect of carrying the pawl $g^4$ and detent $g^6$ into engagement with the ratchet $e$ and of breaking the circuit in which the shunt-conductor $t$ is located by opening the switch T, and thereby causing the current to pass through the terminals $f'$ and $h$ of the circuit-breaker to the electromagnet G, with the necessary succession of makes and breaks in the circuit thus established to effect the required intermittent progressive rotation of the current-controller F, while the disconnection of the conductor K' from the trolley D will cause the demagnetization of the electromagnet N and carry and hold the pawl $l^8$ out of engagement with its coöperating ratchet $l^6$, with the result of preventing any movement of the reversing-switch during the forward rotation of the current-controller. In the position to which the switch is thus moved it will be retained until it is desired to arrest the movement of the motor, when the former will be turned backward into its normal central position, carrying the several contacts upon it from under and out of engagement with their coöperating immovable contacts, and thereby breaking the various circuits established by it. The motion of the motor having been thus arrested and it being the desire to start it again in the same direction, all that is necessary is to rotate the body U' of the switch in the same direction as before, when the same connections and disconnections of the several conductors with and from the trolley will result, the same circuits made and broken, and the same operations of parts repeated as before, and so on. On the other hand, the reversal of the direction of motion of the motor and the starting and stopping of the same when thus reversed are effected by rotating the body U' of the switch from its normal central position in the direction of the arrow 2 in Figs. 6 and 7, when the contacts $u^5$, $u^6$, $u^8$, and $u^7$ will be respectively carried beneath and against the immovable contacts $v$, $v'$, $v^4$, and $v^3$, the contact $u^6$ carried from under and away from the contact $v'$, the respective conductors L', L, and K connected with the trolley D, and the conductor L' disconnected therefrom, all as is common to the conductors K', L, and K and to their coöperating contacts when the body U' of the switch is rotated in the former direction, with the consequent effect that with the former the electromagnets N', G, and I will be rendered active and the first inactive in the required order to first bring the pawl $l^9$ into engagement with the ratchet $l^7$, next to move such ratchet forward to oscillate the reversing-switch F to its opposite limit of movement, next to carry the pawl $g^4$ and detent $g^6$ into engagement with the ratchet $e$ and open the switch T to bring the circuit-breaker into operation to cause the progressive rotation of the current-controller E, and next to remove the pawl $l^9$ from its coöperating ratchet $l^7$ to prevent the movement of the reversing-switch F during the rotation of the current-controller in the same manner as is common to the parts when the body U' of the switch is rotated in the opposite direction for a like purpose. With the starting, stopping, and reversal of motion of the motor thus effected by the rotation of the body U' of the switch U in one or the other direction from its normal central position and with a switch of this character applied at each end of a car when employed in connection with a vehicle of that class, it follows that when a number of cars are brought together for operation in a train and the corresponding conductors D', K, L, K', and L' of adjacent cars are appropriately connected the starting, stopping, and reversal of the motion of the several cars may all be effected by the rotation of the body U' of the switch in the required direction at either end of any one of the cars in the series.

When the switches are employed in connection with a car and are located at the opposite ends thereof, the immovable contacts $v'$, $v^2$, $v^3$, and $v^4$ of each switch will be respectively connected with the same conductors, with the exception of the contacts $v$ and $v^2$, which on the switch at one end of the car will be respectively connected with the conductors L' and K', while those on the switch at the other end thereof will be respectively connected with the conductors K' and L' or in a reverse order to the end that the movements of the car toward and away from either end thereof and the stopping of the same when required may be effected by the movements of the switch at one end of the car in the same directions as those of the switch at the other end thereof when the like movements and stops of the car are made with respect to the other end of the same.

While, as before remarked, the reversing-switch F and current-controller E may be of any of the ordinary or well-known forms, the types selected by me for the exemplification of my invention are those shown and described in my before-mentioned Letters Patent, with the former provided with two longitudinal series of contacts $n$ to $n^7$ and $n^8$ to $n^{15}$, respectively, which, secured at some distance apart upon the periphery thereof, coöperate with the series of contacts $m$ to $m^7$, to which are connected the various conductors leading from the current-controller and to the motors, with the individual contacts of each series on the switch connected as shown and the latter equipped with the series of contacts $d^3$ to $d^{18}$, which, connected as shown, coöperate with the series of contacts $d^2$ $e^2$ to $e^{11}$, with which the conductor $d'$, extending from the trolley D, and conductors $a'$ $b^6$ $a^4$ $a^5$ $a^{10}$ $c^3$ $a^9$ $c^7$ $c^6$, leading to and from the current-controller, are respectively attached. Instead, however, of intermittently rotating the reversing-switch at all times in the same direction to effect the successive reversals of the current, as in my aforementioned Letter Patent, I prefer to oscillate it back and forth for that purpose, bringing first one of the series of contacts $n$ to $n^7$ or $n^8$ to $n^{15}$ thereon against the series of contacts $m$ to $m^7$ to cause the current to flow in one direction and then the other of those series to cause it to flow in the opposite direction, thereby causing a reversal of the current at each oscillation of the switch forward or backward. The current-controller, on the other hand, I prefer to operate as in said Letters Patent and to rotate the same to the proper distance to enable it to perform its required functions by several successive forward impulses imparted to the ratchet $e$, which are indicated by the series of parallelly-arranged dotted lines in Fig. 8 and numbered from "1" to "10" therein, respectively. Instead, however, of moving the current-controller forward in unison with the ratchet throughout the entire range of movement of the latter in that direction, as is or may be the case with the current-controller in the Letters Patent aforesaid, I preferably arrange for its movement therewith during a portion of the first forward impulses of the ratchet, then for its retention while the ratchet is being moved forward under a number of subsequent impulses, then for its release and movement quickly forward over the distance of these last-mentioned impulses, and then for its forward movement in unison with the ratchet during the remaining forward impulses of the latter. By this arrangement, as will be seen, I provide for a uniform progressive movement of the current-controller, excepting when the circuit is changed from "series" to "parallel," when it moves forward quickly over a portion of its rotation. In order to provide for this variable movement of the current-controller with respect to its actuating-ratchet, I find it convenient to construct the current-controller shaft $e'$ in two sections and to connect these sections by a spring $E^2$, whereby the one section may be rotated from and in unison with the other when unrestrained and arrested in its rotation and held, when desired, without interfering with the rotation of the latter. This connecting-spring $E^2$ may be of various forms. As here shown, however, it is made in the form of a volute and is connected at its inner end by a screw $e^{12}$ to the end of the section of the shaft $e'$ upon which the ratchet $e$ is secured, and is connected at its outer end by a similar screw $e^{13}$ to the interior circumference of a disk-like drum $E^3$, that is secured to the adjacent end of the other section of the said shaft $e'$, upon which the current-controller E is supported. By this arrangement, as will be seen, the rotation of the current-controller and the section of the shaft $e'$ upon which it is mounted may, when unrestrained, be effected from the ratchet $e$ through the intermediaries of the other section of the shaft and the spring $E^2$, and in order to provide for arresting the rotation of the current-controller and holding it in any required position, while yet allowing of the free and uninterrupted forward rotation of the ratchet $e'$, I equip the disk-like drum $E^3$ with a series of ratchet-teeth $e^{14}$, which project laterally from its side, and employ in connection therewith a pawl $e^{15}$, which, pivoted in a suitable stand or hanger $e^{16}$, secured to the casing H or other appropriate part, is normally held in engagement with the teeth $e^{14}$ of such ratchet by a coiled spring $e^{17}$. As thus arranged the retention of the current-controller at any required position is accomplished by the engagement of the pawl $e^{15}$ with the teeth $e^{14}$ of the ratchet. When the movement of the current-controller E is to be in unison with the ratchet $e$ throughout the range of forward movement of the latter, the teeth $e^{14}$ of the ratchet will preferably extend entirely around the disk-like drum $E^3$. On the other hand, when the movement of the current-controller in unison with the ratchet $e$ is to extend only throughout a portion of the movement of the latter and is then to be held and afterward moved forward rapidly with respect thereto then these teeth $e^{14}$ of the ratchet will extend throughout only a portion of the surface of such drum. In the form of the invention shown in the drawings the movement of the current-controller E in unison with the ratchet $e$ is arranged for the first three forward impulses of the latter. The current-controller is then restrained and held while the ratchet $e$ is being moved forward under its next five impulses, when the former is then released and allowed to move quickly forward over the distance of these five impulses and thereafter move forward in unison with the ratchet during its next two impulses. With the current-controller arranged to move with reference to the ratchet $e$, as thus described, the disk-like drum $E^3$ (outside of the tooth $e^\times$, with which the pawl $e^{15}$ engages when the current-controller is in its initial position) is provided with three ratchet-teeth $e'^\times e^{2\times} e^{3\times}$ opposite the teeth of the ratchet $e$, that receives its first three forward impulses. From the tooth $e^{3\times}$ the disk-like drum $E^3$ is free from ratchet-teeth until a point opposite the ninth tooth of the ratchet $e$ is reached, when opposite that and its next and last tooth the disk-like drum is respectively provided with the two teeth $e^{4\times}$ and $e^{5\times}$. As thus arranged the movement of the current-controller with respect to the ratchet $e$ is effected by properly engaging the pawl $e^{15}$ with and disengaging it from the teeth $e^{14}$ of the disk-like drum $E^3$ in the required order. To effect this, various means may be employed. In my preferred form of construction, however, I accomplish this result by providing the pawl $e^{15}$ with the upwardly and inwardly inclined tail $e^{18}$, which is equipped on its operating edge with a V-shaped cam-surface $e^{19}$ and employ in connection therewith a disk $E^4$, which, fixedly secured to the end of the section of the shaft $e'$ upon which the ratchet $e$ is secured, adjacent to the disk-like drum $E^3$, is provided in its periphery with a series of radial pins $w$ to $w^5$, that are equal in number to the teeth $e^{14}$ in the disk-like drum $E^3$ and, relatively arranged with respect to the teeth of the ratchet $e$, engage with the V-shaped cam-surface $e^{19}$ on the tail $e^{18}$ of the pawl $e^{15}$ as they are carried by it, and thereby successively remove the pawl from engagement with the teeth $e^{14}$. As thus arranged the operation of these parts is as follows:

Starting with the current-controller E and the ratchet $e$ in their initial positions and the disk-like drum $E^3$, disk $E^4$, and pawl $e^{15}$ in the positions shown in Fig. 10, the first forward impulse of the ratchet $e$ by its actuating-pawl $g^4$ will carry the pin $w$ in the disk $E^4$ past and in contact with the cam-surface $e^{19}$ of the tail $e^{18}$ of the pawl $e^{15}$, when such pawl will be disengaged from the tooth $e^\times$ of the disk-like drum and such drum carried forward with the current-controller the distance of one tooth through the intermediary of the spring $E^2$. The drum and current-controller having been thus carried forward in unison with the ratchet $e$ the distance of one impulse, the pawl $e^{15}$ will engage with the next tooth $e'^\times$ and hold those parts in that position until the ratchet $e$ is carried forward the distance of another impulse, when the next pin $w'$ in the series will pass by and engage with the cam-surface $e^{19}$ on the tail $e^{18}$, thereby removing the pawl $e^{15}$ from the tooth $e'^{\times}$ and allowing the disk-like drum and current-controller to again move forward in unison with the ratchet $e$. In the position in which the drum and controller are thus left they will remain until the next forward impulse of the ratchet $e$, when the pin $w^2$ will be carried by and against the cam-surface $e^{19}$ of the tailpiece $e^{18}$, the pawl $e^{15}$ removed from engagement with the tooth $e^{2\times}$, and the disk-like drum and current-controller moved forward a third time in unison with the ratchet $e$. The radial pins being omitted from the disk $E^4$, the next five forward impulses will be given to the ratchet $e$ without the pawl $e^{15}$ being removed from engagement with the teeth $e^{14}$ of the disk-like drum, and the current-controller will be held in the position in which it is thus left until the eighth impulse is given to the ratchet, when the pin $w^3$ will be brought against the cam-surface $e^{19}$ as it is carried past the same, thereby disengaging the pawl $e^{15}$ from the tooth $e^{3\times}$ of the disk-like drum $E^3$ and allowing the current-controller E to be carried quickly forward by the stress of the spring $E^2$ the distance that they would have been carried by those five impulses if the movement of that part had not been restrained. In the position to which the drum and current-controller will thus be carried by the stress of the spring they will be held by the pawl $e^{15}$, engaging with the tooth $e^{4\times}$, until the pin $w^4$ in being carried past the cam-surface $e^{19}$ by the ninth forward impulse of the ratchet $e$ releases the pawl from engagement with the tooth $e^{4\times}$, when the drum-like disk $E^3$ and the current-controller will be again carried forward in unison with the ratchet $e$, which operations will be repeated as the pin $w^5$ is carried past the cam-surface $e^{19}$ of the pawl at the tenth forward impulse of the ratchet $e$, the pawl and teeth $e^{14}$ in the drum-like disk thus serving to hold and the pins $w$ to $w^5$ in like manner serving to release the current-controller in the proper sequence to impart thereto the variable movement with respect to the ratchet $e$ required. The ratchet $e$ and current-controller having been thus moved forward to the limits of their respective movements will be returned to their initial positions when it is desired to arrest the movement of the motor or car by the diaphragm O through the intermediary of the strap or band $o$, and in order to insure of the return of the current-controller in unison with the ratchet $e$ I provide the drum-like disk $E^3$ with a stop $w^6$, with which engages a corresponding stop $w^7$ on the disk $E^4$ as the latter disk is returned with the ratchet $e$. In addition to thus insuring of the return of the parts in unison these stops also serve to prevent the forward movement of the disk-like drum $E^3$ and the current-controller E beyond the required distance under the stress of the spring $E^2$ when the pawl $e^{15}$ is removed from engagement with the teeth $e^{14}$.

With the reversing-switch and current-controller constructed and operated as above described may be employed any convenient arrangement of conductors for connecting them with the trolley D and with the motors as well as the one with the other. I prefer, however, to employ for these purposes that arrangement of conductors which is shown in my before-mentioned Letters Patent, to which reference may be had. It will therefore be seen that by the construction and arrangement of parts above described I provide simple and convenient means whereby a series of current-controllers—as, for instance, those of a series of cars—may be automatically operated in unison with an intermittent and variable movement with respect to their actuating devices by connecting such devices with a trolley or other source of electric supply at a single point as well as the reversing-switches therefor to not only reverse the direction of the current passing thereto, but also to bring them into harmony and synchronism when some of them are occupying positions that are opposite thereto.

While in the foregoing I have described the best means contemplated by me for carrying my invention into practice, I wish it distinctly understood that I do not limit myself strictly thereto, as it is obvious that I may modify the same in various ways without departing from the spirit thereof.

Having now described my invention and specified certain of the ways in which it is or may be carried into effect, I claim and desire to secure by Letters Patent of the United States—

1. The combination, with a current-controller, and a source of electric-current supply, of an electromagnet and connecting and controlling devices intermediate the electromagnet and the current-controller, whereby such current-controller, when brought into operation, may be moved forward with a variable motion, and the variation in this motion at different portions of the travel of the controller predetermined and made uniform at all times; substantially as described.

2. The combination, with a current-controller, a trolley or other source of electric-current supply, an electromagnet and an armature therefor, of connecting and controlling devices intermediate the current-controller, and the armature, and appropriate electric conductors, whereby when such current-controller is brought into operation it may be automatically moved forward with a variable intermittent motion and the variation in this motion at different portions of the travel of the controller predetermined and made uniform at all times; substantially as described.

3. The combination, with a current-controller, a trolley or other source of electric-current supply, an electromagnet, and an armature therefor, of a ratchet, a pawl through which the ratchet is rotated from such armature, devices intermediate the ratchet and the current-controller, and conductors for connecting the electromagnet with the trolley or other source of electric-current supply, whereby a progressive intermittent movement is imparted to said ratchet and the current-controller rotated forward therefrom with a variable intermittent movement, substantially as described.

4. The combination, with a current-controller, a sectional shaft upon one of which sections the controller is mounted, a trolley or other source of electric-current supply, an electromagnet, an armature therefor, and a switch and conductors through which the electromagnet may be brought into circuit with the trolley or other source of electric-current supply, of a ratchet secured to the other of the sections of said shaft, a pawl through which the said ratchet is rotated from the armature, a ratchet upon the first-mentioned section of such shaft, a pawl for coöperating therewith, a spring and a series of pins for engaging this last-mentioned pawl with, and disengaging it from, its coöperating ratchet, and a spring intermediate the sections of the shaft, whereby, when the electromagnet is brought into circuit with the trolley or other source of electric-current supply, the first-mentioned ratchet will be rotated forward with a regular progressive intermittent movement, and the current-controller carried forward thereby with a variable intermittent movement, substantially as described.

5. The combination, with a current-controller, a trolley or other source of electric-current supply, an electromagnet, an armature therefor, a ratchet, a pawl through which the ratchet is rotated from the armature, and devices intermediate the ratchet and current-controller to impart an intermittent variable movement to such current-controller, of a second electromagnet, an armature therefor, devices intermediate this last-mentioned armature and said pawl, and a switch and conductors through which the two electromagnets may be brought into, and carried out of, circuit with the trolley or other source of electric-current supply, whereby the said pawl may be brought into engagement with its coöperating ratchet to impart thereto a progressive intermittent movement, and through it a variable intermittent rotation of the current-controller, and carried out of engagement therewith, when it is desired to return the current-controller to its original normal position, substantially as described.

6. The combination, with a current-controller, a sectional shaft upon one section of which the current-controller is mounted, and a trolley or other source of electric-current supply, of an electromagnet, an armature therefor, a ratchet mounted upon the other section of said shaft, a pawl through which the ratchet is rotated from the armature, a spring intermediate the section of such shaft, a disk provided with teeth upon its side, a pawl for coöperation therewith, a series of pins for engagement with such pawl to remove it from engagement with the teeth, and devices through which the electromagnets may be brought into circuit with the trolley or other source of electric-current supply, whereby a regular progressive intermittent rotation may be imparted to the ratchet, and a variable intermittent motion communicated therefrom to the current-controller, substantially as described.

7. The combination, with a series of current-controllers, and a trolley, or other source of electric-current supply, of devices through which the several current-controllers may be automatically rotated forward in unison with a variable movement from the trolley or other source of electric-current supply, substantially as described.

8. The combination, with a reversing-switch, a trolley or other source of electric-current supply, devices through which such reversing-switch may be oscillated in one and the other direction to effect reversals of the current, of a plurality of electromagnets, armatures therefor, mechanism through which the said devices may be connected with the reversing-switch by said armatures to oscillate the same in one and the other direction as required, and a switch and conductors through which the said devices and electromagnets may be brought into circuit with the trolley or other source of electric-current supply in the required order to effect the required movement of the reversing-switch, substantially as described.

9. The combination, with a reversing-switch, an electromagnet, an armature therefor, a pair of ratchets, pawls through which the said ratchets may be oscillated from the armature, and gearing intermediate the ratchets and the reversing-switch, of a second electromagnet for each of said pawls, an armature for each of said electromagnets connected with such pawl, a trolley or other source of electric-current supply, and means through which the said electromagnets may be brought into circuit with the trolley or other source of electric-current supply to cause the oscillation of the reversing-switch in the required direction, substantially as described.

10. The combination, with a reversing-switch, an electromagnet, an armature therefor, a pair of ratchets, pawls through which the said ratchets may be oscillated from the armature, gearing intermediate the ratchets and the reversing-switch, and a trolley or other source of electric-current supply, of a second electromagnet for each of said pawls, an armature for each of such electromagnets connected with such pawls, and means through which each of these last-mentioned electromagnets may be separately brought into circuit with the trolley or other source of electric-current supply, and also with the first-mentioned electromagnet, to effect the oscillation of the reversing-switch in one or the other direction as may be required, substantially as described.

11. The combination, with a series of reversing-switches, a trolley or other source of electric-current supply, devices through which the several reversing-switches may be brought into synchronism and oscillated in one or the other direction in unison to effect the reversal of the several currents passing therethrough, of a plurality of electromagnets and coöperating armatures for each of such reversing-switches, mechanism through which the said devices may be connected with their respective reversing-switches by said armatures to effect their oscillation in one or the other direction as required, and a switch and conductors through which the said devices and electromagnets may be brought into circuit with the trolley or other source of electric-current supply in the required order to effect the synchronous movement of the series of reversing-switches in the direction desired, substantially as described.

12. The combination, with a series of reversing-switches, a trolley or other source of electric-current supply, an electromagnet, a coöperating armature, and a pair of ratchets for each of said reversing-switches, pawls through which the said ratchets may be oscillated from their respective armatures, and connecting mechanism intermediate the ratchets and their respective reversing-switches, of a second electromagnet for each of said pawls, an armature for each of such electromagnets connected with such pawl, and electrical connection through which the electromagnets of the several reversing-switches may be brought into circuit with the trolley or other source of electric-current supply in the required order to effect the oscillation of the several reversing-switches in synchronism, by closing a single switch, substantially as described.

13. The combination, with a plurality of electric cars, each of which is provided with a reversing-switch and means through which an electric current may be supplied thereto, of an electromagnet arranged upon each of such cars, conductors for conducting an electric current to each of these electromagnets, a switch located on each of the cars for coöperation with these conductors, a pair of ratchets for each of the reversing-switches, pawls through which these ratchets may be oscillated from their respective electromagnets, a second electromagnet with a coöperating armature for each of said pawls for carrying it into and out of engagement with its respective ratchets, gearing intermediate each pair of these ratchets and its respective reversing-switch, and conductors for conducting the electric current to these last-mentioned electromagnets, whereby the several electromagnets on the series of cars may be all brought into circuit with the source of electric-current supply and the several reversing-switches oscillated in one or the other direction, as may be required, by operating the switch on any one of the cars, substantially as described.

14. The combination, with an electromagnet for rotating a current-controller, an electromagnet for engaging the first-mentioned electromagnet with such current-controller and disengaging it therefrom, a plurality of electromagnets for engaging such first-mentioned electromagnet with a reversing-switch, electric conductors for each of such electromagnets, and a trolley or other source of electric-current supply, of a switch through which the said conductors may be brought into electrical connection with the trolley or other source of electric-current supply and disconnected therefrom, to render the said electromagnets active and inactive in the required order, substantially as described.

15. The combination, with an electromagnet for rotating a current-controller, an electromagnet for engaging the first-mentioned electromagnet with such controller and disengaging it therefrom, a plurality of electromagnets for engaging such first-mentioned electromagnet with a reversing-switch, electric conductors for each of such electromagnets, and a trolley or other source of electric-current supply, of an oscillatory switch through which the said conductors may be brought into electrical connection with the trolley or other source of electric-current supply to render the electromagnets active in one order when oscillated in one direction and in another order when oscillated in the other, substantially as described.

16. The combination, with a series of electrically-propelled cars each of which is provided with an electromagnet for rotating a current-controller, an electromagnet for engaging the first-mentioned electromagnet with its respective current-controller and disengaging it therefrom, a plurality of electromagnets for engaging the said first-mentioned electromagnet with, and disengaging it from, a current-reversing switch, and a trolley or other source of electric-current supply, of electric conductors for each of the said electromagnets, which may be made continuous throughout the series of cars, and switches through the operation of any one of which the said conductors may be brought into, and carried out of, electrical connection with said trolley or other source of electric-current supply to render the respective electromagnets throughout the series of cars active and inactive in synchronism, substantially as described.

17. The combination with the electromagnets G, I, N, and N', the conductors L, K, K', and L', the trolley D, and connections between the said electromagnets and their respective conductors, of an oscillatory switch, U, provided with suitable contacts, a coöperating series of contacts, and connections intermemediate these last-mentioned contacts and the trolley or other source of electric-current supply and the said conductors, substantially as described.

18. The combination with the ratchet $e$, the electromagnet G, the armature G', the pawl $g^4$ connected with such armature G', means through which an electric current may be supplied to said electromagnet, a circuit-breaker whereby the said electric current may be interrupted and allowed to flow a number of times in succession, and a current-controller, of a sectional shaft, $e'$, upon which the ratchet $e$ and current-controller are supported, a spring, $E^2$, intermediate the sections of such shaft, a disk-like drum, $E^3$, mounted upon the end of one of such shaft-sections, and provided with ratchet-teeth $e^{14}$ upon its side, a disk, $E^4$, secured to the adjacent end of the other shaft-section and provided with a series of radial pins, and a pawl, $e^{15}$, for engaging with said ratchet-teeth, $e^{14}$, and provided with an upwardly and inwardly inclined tail, $e^{18}$, that is equipped with a cam-surface, $e^{19}$, with which the radial pins in the disk $E^4$ engage as they are carried past it by the rotation of the disk $E^4$, substantially as described.

19. The combination, with the sections of the shaft $e'$, the disk-like drum $E^3$ mounted on the end of one of such sections and provided with ratchet-teeth $e^{14}$ projecting from its side, the disk $E^4$ mounted upon the adjacent end of the other of such sections and provided with radial pins, and the spring $E^2$ through which the two sections of the shaft are connected, of the pawl $e^{15}$ having the upwardly and inwardly projecting tail $e^{18}$ equipped with the cam-surface $e^{19}$, and the spring $e^{17}$, substantially as described.

20. The combination, with the reversing-switch F, the shaft $p$ upon which it is mounted, the ratchet $l^6$ and $l^7$, the pawls $l^8$ and $l^9$, the electromagnets G, N, and N', the armatures G', S, and S', connections between such pawls and the said armatures, means through which the said electromagnets may be rendered active and inactive in the required order, and the gearing intermediate the said ratchets and the shaft of the reversing-switch, substantially as described.

In testimony whereof I have hereunto set my hand this 25th day of June, 1898.

FRANK H. FOSTER.

Witnesses:
WM. H. APPLETON,
R. F. SWEENY.